Aug. 14, 1923.
A. ROSNER
1,464,663
IMPULSE COUPLING
Filed July 22, 1921
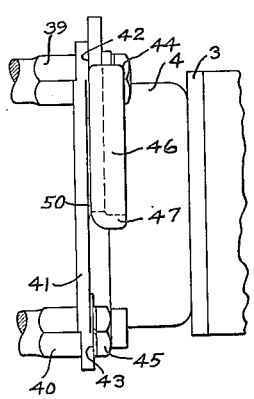
Fig. 4
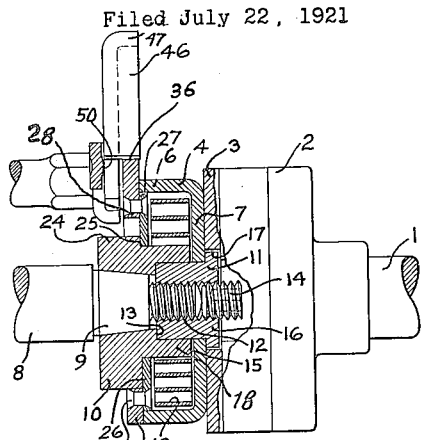
Fig. 1
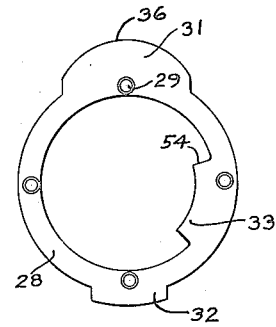
Fig. 9
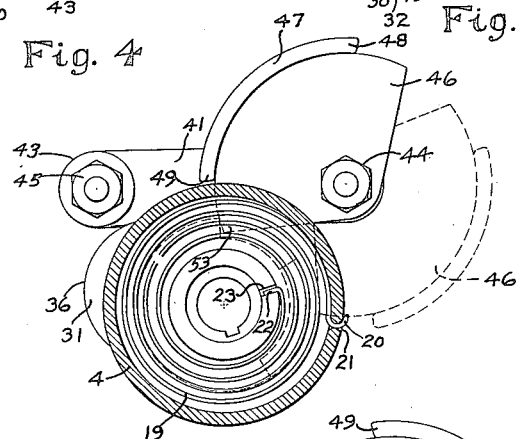
Fig. 2     Fig. 3
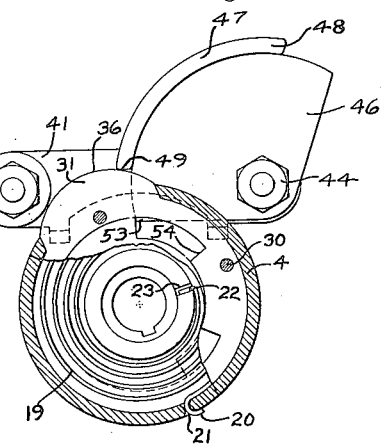
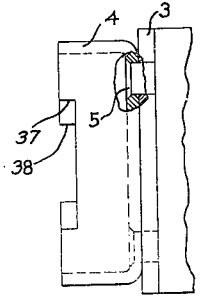
Fig. 8
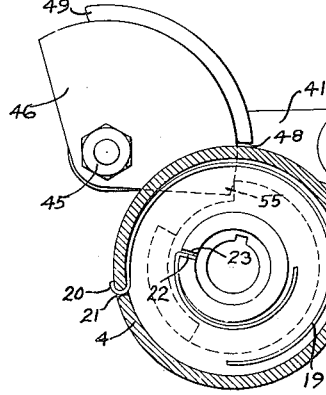
Fig. 5
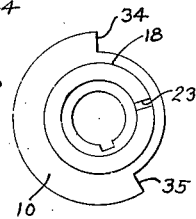
Fig. 6
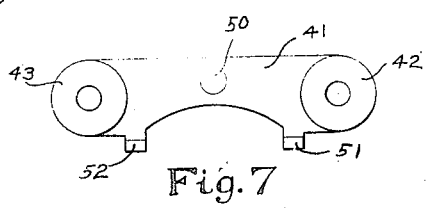
Fig. 7
INVENTOR
ADOLPH ROSNER
BY
ATTORNEY Patented Aug. 14, 1923.

1,464,663

UNITED STATES PATENT OFFICE.

ADOLPH ROSNER, OF SPRINGFIELD, MASSACHUSETTS, ASSIGNOR TO AMERICAN BOSCH MAGNETO CORPORATION, OF SPRINGFIELD, MASSACHUSETTS, A CORPORATION OF NEW YORK.

IMPULSE COUPLING.

Application filed July 22, 1921. Serial No. 486,910.

*To all whom it may concern:*

Be it known that I, ADOLPH ROSNER, a citizen of the United States, residing at 4 Ventura Street, Springfield, in the county of Hampden, State of Massachusetts, have invented certain new and useful Improvements in Impulse Couplings; and I do hereby declare the following to be a full, clear, and exact description of the invention, such as will enable others skilled in the art to which it appertains to make and use the same.

The present invention relates to an impulse coupling of the type adapted for use with magnetos for ignition systems, and which comprises driving and driven members and an impelling spring arranged to be stressed upon angular displacement of such members.

Heretofore, such impulse couplings were constructed from machined parts or drop forged members, such that the coupling as a whole involved a large number of steps in a long process of manufacture, and also a high cost of production. In accordance with this part of the invention, I have constructed an impulse coupling with an encasing structure comprising a sheet metal member, preferably struck-up, forming a part of the driving member, and a sheet metal releasing member connected to and rotatable with the driving member, the releasing member cooperating with a locking member to release the same from the driven member. The encasing structure accordingly comprises a pair of sheet metal members, one of which may be fastened to the driving member and one may have a bearing upon the driven member, whereby the encasing structure is maintained in co-axial alignment as well as possessing rigidity against the impact or blows received by the coupling. In the specific construction of the coupling herein described, one of the members is in the form of a cup fastened to the driving member and having, in its open end, an enclosing member which has a bearing on the driven member, the enclosing member fitting within the open end of the cup member, so as to give to the cup member rigidity during the releasing action of the releasing member, the releasing member being rotatable with the cup member for periodically releasing the locking member. With such construction, the coupling as a whole is greatly reduced in weight and requires fewer manufacturing operations at a greatly reduced cost.

In the prior devices, the locking pawl was usually a machined or forged member, and accordingly, was also more costly to manufacture and more difficult to produce accurately. Whether or not the encasing structure be of sheet metal members, I have constructed the locking pawl of my coupling of sheet metal, preferably having a cam engaging flange adapted to lock the driven member during a predetermined angular movement of the driving member.

In prior devices, the locking pawl in its arresting position was usually supported upon the periphery of the driven member, and the pawl thus received considerable wear, so that after wearing to a certain extent, the time of disengagement of the locking pawl was somewhat varied. In accordance with this part of the invention, I have constructed the support for the locking member with a rest member adapted to hold the locking member in locking position, but out of rubbing contact with the periphery of the driven member.

In the accompanying drawings which show, as an example, a hand-set impulse coupling for a magneto having one impulse per rotation.

Fig. 1 is a view partly in side elevation and partly in section of a coupling; Fig. 2 is an end view of the coupling with an encasing member thereof in transverse section; Fig. 3 is a view similar to Fig. 2 with the parts in a different position of operation; Fig. 4 is a top plan view of the coupling assembly showing broken portions of the supporting posts; Fig. 5 is a view similar to Fig. 2, showing the arrangement for counter clockwise operation; Fig. 6 is an end view in detail of the coupling hub piece on the driven member; Fig. 7 is a side view of the supporting strap; Fig. 8 is a view in elevation of the driving member with a portion shown broken away; and Fig. 9 is a detail view of the releasing member.

The coupling is connected to a driving shaft 1 upon the end of which is mounted a flexible coupling 2 of any suitable construction, such flexible coupling having an end member 3 to which is secured one of the encasing members 4 of the impulse coupling, such encasing member being preferably secured to the end member 3 by means of rivets 5, as is more clearly shown in Fig. 8 of the drawing. The encasing member 4 is of cup shape having an axial flange 6 and a web portion 7 provided with a central aperture bearing upon a portion of the driven member, as will be more fully hereinafter described.

The driven member comprises a driven shaft 8 which is a part of the rotor of the magneto and is provided with a tapered end 9 upon which is keyed a coupling hub 10, the latter being held snugly into place by a nut 11 threaded to the threaded end 12 of the shaft 8 and having a thrust engagement with a shoulder 13 formed within the coupling hub 10. The nut 11 may be maintained in position by a lock socket-screw 14 threaded into the nut 11 and binding with the end 12 of the shaft. It will thus be observed that the web portion 7 bears upon the exterior surface of the nut 11 between the end 15 of the hub 10 and the head portion 16 formed upon the nut 11, the head 16 extending into a central aperture formed in the end member 3 of the flexible coupling, the latter being otherwise provided with an internal bore 17.

Between the shank portion 18 of the coupling hub 10 and the flange 6 of the cup member 4 is located a flat spiral spring 19 having a hooked end 20 thereof extending through a slot 21 formed in the flange 6, and its inner hooked end 22 thereof fitting into the radial slot 23 provided in the shank portion 18, such that the spring will normally resist angular displacement of the cup 4 and the hub 10 whenever the latter is, for any time, held in stationary position while the cup 4 is rotated with the coupling 2 upon the driving action of the shaft 1. The hub 10 has a head portion 24 providing a shoulder 25 against which rests an enclosing member or plate 26 of sheet metal which is centrally apertured to afford a bearing upon the shank 18 of the coupling hub 10 and having its periphery 27 fitting just within the open end of the cup 4. It will thus be seen that this member, being interposed between the margin of the flange 6 and the shank of the coupling head, acts as a supporting member for the cup 4 at the time the latter tends to be thrown out of alignment by the impacts or blows received by the coupling, as will more clearly hereinafter appear.

To the member 26 is secured a releasing member 28 which is a sheet metal punching, or formed of sheet metal, of generally circular form. This member is provided with a plurality of apertures 29, registering with similar apertures provided in the member 26, through which extend rivets 30 for securely fastening the releasing member to the member 26, as is clearly shown in Fig. 1 of the drawing. The releasing member 28 has oppositely disposed radial extending portions 31 and 32 and an inwardly extending abutment portion 33 of arc-shape, the latter being adapted to angularly oscillate between the shoulders 34 and 35 of the coupling hub, as is clearly shown in Figs. 2, 3, 5 and 6 of the drawing, thus permitting relative angular movement between the releasing member 28 and the coupling hub 10. The portion 31 of the releasing member has a curved cam surface 36 of the proper form to co-act with the locking pawl hereinafter more fully described. The flange 6 of the cup member 4 is provided with a pair of radially extending arc-shaped notches 37 and 38 into which respectively fit the radially extending portions 31 and 32, so that the releasing member may be connected or locked with the cup member 4 and be caused to rotate in unison therewith, as the latter is driven by the driving elements of the coupling.

Above the driven shaft and a portion of the coupling hub is located a pair of horizontal supporting posts 39 and 40 of similar construction, such posts being secured in any suitable manner to the frame or other suitable part of the magneto, such as the pole shoes thereof, with the outer ends of the posts extending partly over the coupling. One of these posts, such as the post 39, is preferably made of brass, while the other post may be made of cast iron or steel, as desired, the post 39 being made of brass for the purpose of preventing magnetic flux through the supporting structure. The free ends of the posts are connected together by a strap member 41 which also may be made of brass, for the further purpose of preventing magnetic flux through the supporting structure. This strap member is preferably formed with a pair of bosses 42 and 43 at or near the ends thereof and surrounding the free extending end portions of the posts, such end portions being threaded to receive nuts 44 and 45.

The locking mechanism of the coupling comprises a weight or pawl 46 which is preferably in the form of a sector and pivotally mounted upon one of the posts 39 or 40, it being shown in Figs. 4 as being mounted upon the post 39 between the nut 44 and the boss 42. This pawl is made from sheet metal, preferably pressed up, and provided with an arcuate flange 47 having cam engaging ends 48 and 49, one end being adapted for use for clockwise operation of the coupling and the other for counter clockwise operation thereof. The strap 41 may also be provided at a central portion thereof with a pressed-up projection 50 against which the pawl may slightly rub or contact in order to maintain the pawl in properly spaced relation with respect to the strap and in alignment with the shoulders 34 and 35 of the coupling hub 9. The strap is also provided with a pair of depending and laterally projecting rest or supporting lugs 51 and 52 which are adapted to support the locking pawl 46 in locking position, as is clearly shown in Fig. 3, the locking pawl resting upon one of the rests 51 or 52 when being engaged with the shoulder 34 or 35, as the case may be, of the coupling hub and not resting upon the coupling hub itself.

In operation, the shaft 2 is continually driven from an internal combustion engine, usually from a cam shaft thereof, and it drives therewith, the flexible coupling 2 with the end member 3 and the cup member 4. When it is desired to put the impulse coupling in operative condition, the locking pawl 46, which normally in its inoperative position, as shown in dotted lines in Fig. 2 of the drawing, may be manually lifted and turned in the full line position shown in Fig. 2 of the drawing. In the latter position, the locking pawl rests upon the lug 51 so as to present an engaging portion 53 thereof in the path of travel of the shoulder 34 of the coupling hub 10. Assuming the latter to be in a position shown in Fig. 2 where the shoulder 34 engages with the engaging portion 53 of the locking pawl, and the driving members 1, 2, 3 and 4 are rotating, the spring 19, by reason of its connection with the cup 4, is stressed and at the same time, the releasing member 28, with its cam engaging portion 31, is rotated from the position thereof shown in Fig. 2 to the position thereof shown in Fig. 3 of the drawing. In the latter position, the cam surface 36 comes into engagement with the end 49 of the locking pawl and gradually rotates the locking pawl in clockwise direction about its pivotal mounting upon the post 39. It will thus be observed that upon further movement of the releasing member 28 and the cam portion 31, the locking pawl will reach a still higher position, such that its engaging portion 53 will become disengaged from the shoulder 34 of the coupling hub. Upon such disengagement, the spring 19, by reason of its connection with the hub 10 will immediately angularly impel the hub member 10 in the direction of rotation of the driving member until the shoulder 34 contacts with an end portion or shoulder 54 of the stop portion 33 of the releasing member. The driving members 1, 2, 3 and 4 and the hub 10, as well as shaft 8, continue to rotate together until the shoulder 34 is again presented to the end 53 of the locking pawl, assuming that the rotation of the members is at a low speed, after which the above operation is repeated. It will be thus observed that as the cam member 31 passes from under the end 49 of the locking pawl, the latter may again fall by gravity until it rests upon the lug 51 in position to again engage the shoulder 34, as the latter returns into the position shown in Fig. 2. When, however, ignition is effective in the internal combustion engine, the latter will increase its speed and consequently, the driving members 1, 2, 3 and 4 of the coupling. At a predetermined speed of rotation thereof, the cam surface 36 of the releasing member will contact with the end 49 of the locking pawl with sufficient impact or force to overcome the gravitational force of the locking pawl and to impart to it sufficient momentum that it will move into the dotted line position shown in Fig. 2, the locking pawl thus being thrown out of operation altogether. The coupling will then continue to operate as a single unitary device, the spring 19 being sufficiently strong to permit a direct drive between the members without angular relative variation.

When it is desired, however, to operate the impulse coupling in a counter-clockwise direction, the posts 39 and 40 may be interchanged in position and the pawl pivotally mounted upon the end of the post located at the left side of the coupling, as viewed in Fig. 5 of the drawing, so as to present the other end 55 of the pawl to the shoulder 35 of the coupling hub 10 when the latter is rotated in counter-clockwise direction. In order that the spring may be operative in the counter-clockwise direction, the same is removed from the encasing structure and reversed in position, as is clearly shown by the position of the broken portions of the spring shown in Fig. 5 of the drawing. At the same time, the releasing member is also removed from the notches formed in the cup member and reversed in position, so as to locate the stop segment 33 on the opposite side of the center of the coupling, as is also clearly shown in Fig. 5. In this position of the parts, the cam portion 31, as it rotates counter-clockwise, will engage with the cam contacting end 48 of the flange 47 of the pawl, so as to raise the same about its new pivotal mounting. At a given high speed of rotation, the impact of the cam surface 36 with the end 48 will be sufficient to cast the pawl into inoperative position, similarly to when the parts were arranged for clockwise operation. Further details of operation in counter-clockwise direction is deemed to be clear from the above description, in connection with the operation of the parts when arranged for clockwise operation.

Having thus described my invention what I claim is:

1. In an impulse coupling comprising driving and driven members and an impelling spring arranged to be stressed upon angular displacement of said members, the combination of an encasing structure comprising a sheet metal member forming part of the driving member, a locking member for said driven member, and a sheet metal releasing member connected to and rotatable with said driving member, said releasing member having means for releasing the locking member and also having means for arresting the driven member after release.

2. In an impulse coupling comprising driving and driven members and an impelling spring arranged to be stressed upon angular displacement of said members, the combination of an encasing structure comprising a struck-up sheet metal member forming part of the driving member, a locking member for said driven member, and a sheet metal releasing member connected to and rotatable with said driving member, said releasing member having means for releasing the locking member and also having means for arresting the driven member after release.

3. In an impulse coupling comprising driving and driven members and an impelling spring arranged to be stressed upon angular displacement of said members, the combination of an encasing structure comprising a pair of sheet metal members fastened to the driving member and having a bearing upon the driven member respectively, whereby said encasing structure is maintained in co-axial alignment, and a locking member for said driven member, one of said sheet metal members being fastened to said driving member, and one carrying a releasing element for the locking member.

4. In an impulse coupling comprising rotatable driving and driven members and an impelling spring arranged to be stressed upon angular displacement of said members, the combination of an encasing structure for said spring, said structure comprising a cup member fastened to said driving member and an enclosing member having a bearing on said driven member and fitting within the open end of said cup member, and a locking member for said driven member, said enclosing member carrying a releasing cam for the locking member.

5. In an impulse coupling comprising driving and driven members and an impelling spring arranged to be stressed upon angular displacement of said members, the combination of a locking mechanism therefor comprising a sheet metal locking pawl for locking the driven member during a predetermined angular movement of the driving member, and a releasing member connected to and rotatable with said driving member for releasing said locking pawl from said driven member, said releasing member having means for releasing the locking member and also having means to arrest the driven member after release.

In testimony whereof I affix my signature.

ADOLPH ROSNER.